United States Patent [19]
Brandt

[11] Patent Number: 5,965,471
[45] Date of Patent: Oct. 12, 1999

[54] WEAR AND THERMAL SHOCK RESISTANT SIAION CUTTING TOOL MATERIAL

[75] Inventor: Gunnar Brandt, Solna, Sweden

[73] Assignee: Sandvik AB, Sandviken, Sweden

[21] Appl. No.: 08/818,865

[22] Filed: Mar. 17, 1997

[51] Int. Cl.$^6$ .................................................. C04B 35/599
[52] U.S. Cl. ............................................................ 501/98.2
[58] Field of Search ............................................ 501/98.2

[56] References Cited

U.S. PATENT DOCUMENTS

| | | | |
|---|---|---|---|
| 4,563,433 | 1/1986 | Yeckley et al. ........................ | 501/98.2 |
| 4,711,644 | 12/1987 | Yeckley et al. . | |
| 4,789,277 | 12/1988 | Rhodes et al. . | |
| 4,818,635 | 4/1989 | Ekström et al. . | |
| 4,900,700 | 2/1990 | Jun et al. . | |
| 4,961,757 | 10/1990 | Rhodes et al. . | |
| 5,302,329 | 4/1994 | Shiogai et al. ........................ | 501/98.2 |
| 5,370,716 | 12/1994 | Mehrotra et al. . | |

FOREIGN PATENT DOCUMENTS 2 155 007   9/1985   United Kingdom .

OTHER PUBLICATIONS

Stephen J. Burden et al., "Comparison of Hot–Isostatically–Pressed and Uniaxially Hot Pressed Alumina–Titanium Carbide Cutting Tools", Ceramic Bulletin, vol. 67, No. 6, pp. 1003–1005, 1988.

Huet, J.F. and Kramer, B.M., "The Wear of Ceramic Tools", Proceedings of the 10th North American Metalworking Research Conference, ed. R.S. Hahn, ASME, Dearborn, MI, 1993, pp. 297–304.

Brandt, G., Gerendas, A. and Mikus, M., "Wear Mechanisms of Ceramic Cutting Tools When Machining Ferrous and Non–ferrous Alloys", Journal of the European Ceramic Society, 1990, pp. 273–290.

*Primary Examiner*—Karl Group
*Attorney, Agent, or Firm*—Burns, Doane, Swecker & Mathis, L.L.P.

[57] ABSTRACT

A sintered ceramic material for high speed machining of heat resistant alloys is provided comprising SiAlON grains and 0.2–20 v/o intergranular phase. At least 80 v/o of said SiAlON phase is beta SiAlON having a z-value greater than 1.0, but less than 1.5. The ceramic material has a Vickers Hardness HV1 of more than 1530 and it is produced by gas pressure sintering.

5 Claims, 1 Drawing Sheet

WEAR AND THERMAL SHOCK RESISTANT SIAlON CUTTING TOOL MATERIAL

BACKGROUND OF THE INVENTION

The present invention relates to SiAlON material compositions particularly useful for machining of heat resistant alloys.

Heat resistant alloys are generally machined at very low cutting speeds when using cemented carbide tools due to the very low machinability of heat resistant alloys in comparison to cast iron and steel. More recently developed ceramic cutting tool materials like SiAlON (U.S. Pat. No. 4,711,644, U.S. Pat. No. 4,818,635 and U.S. Pat. No. 5,370,716) or silicon carbide whisker reinforced alumina tools (U.S. Pat. No. 4,789,277 and U.S. Pat. No. 4,961,757) have significantly increased the productivity by permitting much higher cutting speeds than can be utilized when using cemented carbide tools. Silicon carbide whisker reinforced alumina tools can normally be used at higher cutting speeds than SiAlON tools due to a better chemical stability whereas SiAlON tools can be used at higher feed rates due to a better toughness behavior. Commercial SiAlON ceramic cutting tools either are pure beta SiAlON ($Si_6$—$_zAl_zO_zN_{8-z}$) where 0<z<3 and intergranular phases, or beta plus alpha SiAlON [$(Si,Al)_{12}M_x(O,N)_{16}$ where x is between 0.1 and 2 and M can be Li, Ca, Mg, Hf, Zr, Ce, Y, Sc or other lanthanides] and intergranular phases.

U.S. Pat. No. 4,818,635 discloses a SiAlON material, where the presence of polytype of SiAlON together with beta and/or alpha SiAlON constitutes the main components.

U.S. Pat. No. 5,370,716 claims a ceramic metal cutting material consisting of SiAlON grains and an intergranular phase. Preferably 70% of the SiAlON grains consist of beta SiAlON, $Si_6$—$_zAl_zO_zN_{8-z}$, with z values between 1.5 and 3.

OBJECTS AND SUMMARY OF THE INVENTION

It is an object of this invention to avoid or alleviate the problems of the prior art.

It is further the object of this invention to provide SiAlON material compositions particularly useful for machining of heat resistant alloys.

In one aspect of the invention there is provided a sintered ceramic material for high speed machining of heat resistant alloys, said ceramic comprising SiAlON and 0.2–20 v/o intergranular phase whereby at least 80 v/o of said SiAlON phase is beta SiAlON ($Si_6$—$_zAl_zO_zN_{8-z}$) having a z-value greater than 1.0, but less than 1.5, said sintered ceramic material having a Vickers Hardness HV1 of more than 1530.

In another aspect of the invention there is provided a method of manufacturing the material described above comprising mixing powders, pressing same to form blanks and sintering the blanks using gas pressure sintering whereby the final part of the sintering takes place at 1700° C.–1800° C. and 10–15 bar nitrogen for 1–3 hours.

In yet another aspect of the invention there is provided a method of high speed machining of heat resistant alloys comprising bringing a cutting tool of the material described above into contact with a workpiece of a heat resistant alloy and moving at least one of the cutting tool and the workpiece to remove material from the workpiece.

BRIEF DESCRIPTION OF THE DRAWINGS

The FIGURE shows a typical microstructure of a SiAlON material according to the present invention in 8000× magnification. The dark elongated phase is beta SiAlON phase and the white phase is intergranular phase.

DETAILED DESCRIPTION OF THE PREFERRED EMBODIMENTS OF THE INVENTION

Figure 1:
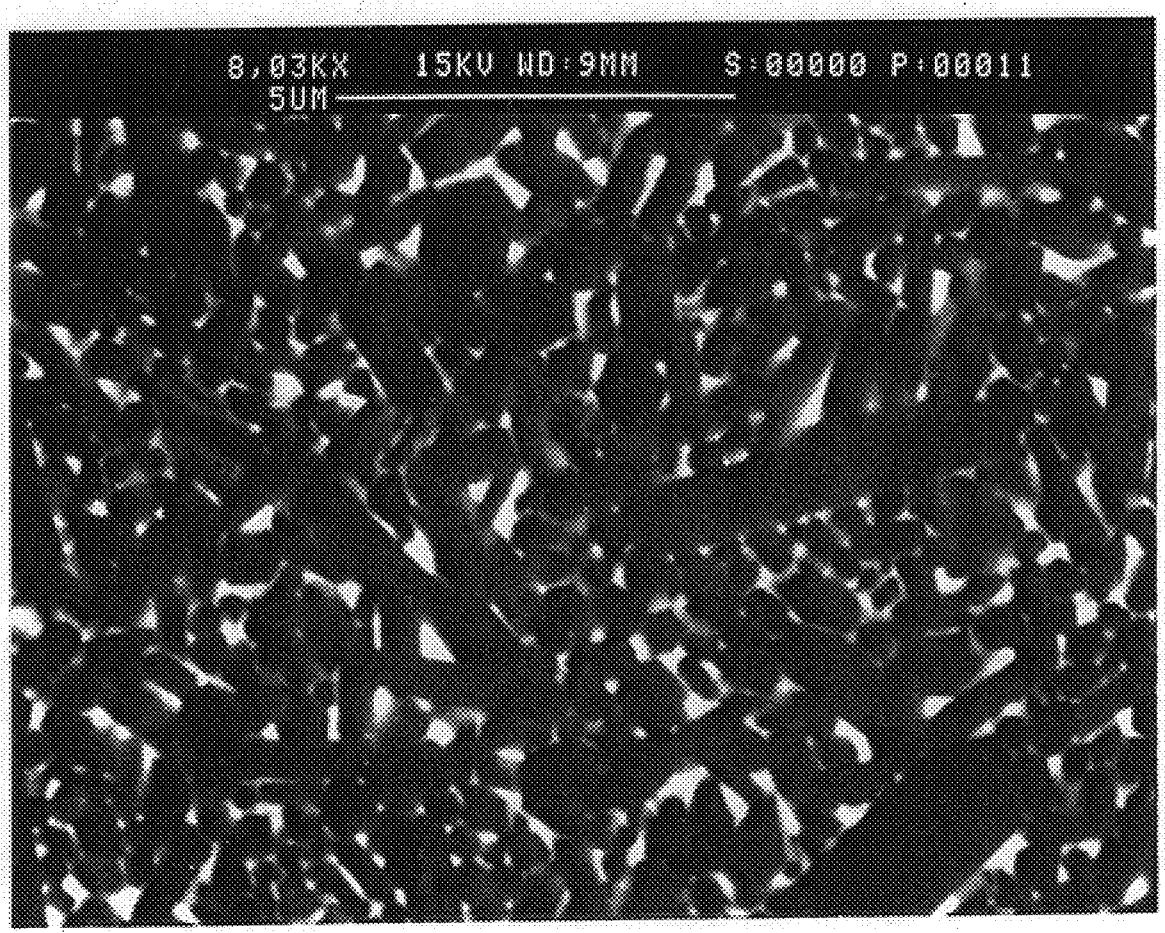

The present invention relates to a new ceramic SiAlON cutting tool material based on beta SiAlON with significantly improved wear resistance compared to commercial grades of SiAlON with low z-values (z<0.5) and significantly improved thermal shock resistance, without sacrificing wear resistance, compared to commercial SiAlON grades with high z-values (z>1.5).

The z-value of a pure beta SiAlON type of material has been found to be very critical with respect to the cutting performance when machining heat resistant alloys.

One characteristic feature about heat resistant alloys is the very high temperatures generated during machining. Typical cutting edge temperatures when machining cast iron range from 500° C.–800° C. Steel machining generates considerably higher temperatures of about 1000° C.–1200° C. but in a heat resistant alloy like Inconel 718 even about 200° C. higher temperatures than in steel have been measured (Huet, J. F., Kramer, B. M., "The Wear of Ceramic Cutting Tools", Proceedings of the 10th North American Metalworking Research Conference, ed R. S. Hahn, ASME, Dearborn, Mich., 1983, pp 297–304).

These high temperatures, generated when machining Inconel 718, are enough to cause thermal cracking even in a very thermal shock resistant material like alpha+beta–SiAlON when machining at high cutting speeds (G. Brandt et al., "Wear Mechanisms of Ceramic Cutting Tools When Machining Ferrous and Non-Ferrous Alloys", J of the European Cer Soc (1990) 273–290.).

It is thus of utmost importance, when developing a material for heat-resistant alloy machining, not only to optimize wear resistance, toughness and strength but also include thermal shock resistance evaluations, since thermal cracking can be the critical factor determining tool life.

Two approaches are generally used to determine the thermal shock resistance of cutting tools; one is calculation of the thermal shock resistance parameter of the material, based upon critical figures of merit (thermal conductivity, strength, modulus of elasticity, thermal expansion coefficient), the other is to experimentally determine the critical temperature difference needed to introduce thermal cracks in the material. The calculated critical temperature difference can differ considerably from that measured under real conditions.

In the development of the present SiAlON-material, an indentation-quench method was used to determine the resistance to thermal cycling. The inserts to be tested were precracked with Vickers indents to get cracks of well defined size and location. The indented inserts were then heated to different temperatures ranging from 300 to 900° C. (at 25° C. intervals) in a furnace and subsequently quenched into boiling water. The critical temperature difference $\Delta T_c$ was defined as the lowest temperature difference ($T_{furnace}$–100° C.) where the following two conditions were simultaneously fulfilled:

a) the average elongation of the cracks was more than 10% of the original length b) more than 25% of the cracks had propagated.

The invention is additionally illustrated in connection with the following Examples which are to be considered as illustrative of the present invention. It should be understood, however, that the invention is not limited to the specific details of the Examples.

EXAMPLE 1

Thermal Shock Resistance

A number of different commercial silicon nitride and beta SiAlON compositions as well as some compositions produced according to Table 1 were used to evaluate the influence of z-value (see Table 2) on the thermal shock resistance.

In Table 1, examples are given of SiAlON materials produced.

TABLE 1

| | Amounts in Weight % | | | | | |
|---|---|---|---|---|---|---|
| Material | $Si_3N_4$ | $Al_2O_3$ | $Y_2O_3$ | AlN | z-value | Sintering at 1775° C. |
| 1 | 87.3 | 6.3 | 6.4 | — | 0.25 | $N_2$, 1 bar |
| 2 | 78.7 | 8.3 | 6.3 | 6.7 | 0.72 | $N_2$, 1 bar |
| 3 | 66.8 | 18.2 | 5.0 | 10.0 | 1.41 | *GPS, $N_2$, 12 bar |
| 4 | 62.7 | 24.2 | 4.9 | 8.2 | 1.97 | $N_2$, 1 bar |
| 5 | 62.7 | 24.2 | 4.9 | 8.2 | 1.95 | *GPS, $N_2$, 10 bar |

*GPS = Gas Pressure Sintering

The following results were obtained:

TABLE 2

| | Experimentally determined $\Delta T_c$-values | |
|---|---|---|
| z-value | $\Delta T_c$° C. | Material from Table 1 |
| 0 | 700 Commercial Silicon Nitride A | — |
| 0 | 600 Commercial Silicon Nitride B | — |
| 0 | 575 Commercial Silicon Nitride C | — |
| 1.41 | 600 Invention | 3 |
| 1.78 | 275 Prior Art (Commercial SiAlON) | — |
| 1.95 | 250 Comparative | 4 |
| 1.97 | 250 Comparative | 5 |

It is obvious from the results that z-values above 1.5 drastically reduce the thermal shock resistance whereas a variation between 0–1.4 seems to have very little effect since a z-value of 1.4 gives a $\Delta T_c$ of the same order as for silicon nitride materials.

EXAMPLE 2

SiAlON materials with z=1.4 (according to the invention) and z=1.9 (prior art, commercial SiAlON) were used in a cutting operation designed to simulate machining under heavy thermal loads like machining with short machining times or varying depth of cut. The operation was a facing operation of an Inconel 718 bar with a diameter of 200 mm. Cutting fluid was used. The facing was discontinuous so that seven entrances and exits were obtained during one facing in order to vary the cutting edge temperature.

The following cutting data were used:

Cutting speed: 200 m/min

Feed: 0.25 mm/rev

Depth of cut: 2.0 mm

Results:

| z-value | Number of Cuts | Average |
|---|---|---|
| 1.4 (invention) | 1.0; 0.85 | 0.92 |
| 1.9 (prior art) | 0.42; 0.25 | 0.34 |

It is obvious from the machining test that the z-value or thermal shock resistance has a critical influence on tool life for a machining operation with a heavy thermal load.

EXAMPLE 3

Wear resistance

When machining a bar of Inconel 718 with inserts of type RNGN 120716E the following cutting data were used:

Cutting speed: 350 m/min

Feed: 0.2 mm/rev

Depth of cut: 2.0 mm

Flood coolant was used

Materials with different z-values were selected to study the influence on maximum flank wear. Material numbers refer to Table 1.

Results:

| Material | z-value | Flank Wear max, mm |
|---|---|---|
| 1 | 0.25 | 0.58 |
| 2 | 0.72 | 0.47 |
| 3 | 1.41 | 0.37 |
| 5 | 1.95 | 0.34 |

Maximum flank wear decreases with increasing z-value. However, the effect is less pronounced at higher z-values (z>0.7).

EXAMPLE 4

Flank wear measurements were performed using different types of AlN starting materials. AlN cannot be used in water based systems since it readily decomposes to aluminum hydroxides. From a processing point of view the 21 R polytype material (phase with a superstructure of wurzit type and situated close to the AlN-corner in the SiAlON-phase diagram) can advantageously replace AlN since it is stable in water.

Cutting inserts with ISO-designation RNGN 120700E were manufactured using types and amounts of starting materials listed in Table 3.

TABLE 3

| Starting Material | Grade | Amount, Weight % | Manufacturer |
|---|---|---|---|
| Silicon Nitride | SN E-10 | 67.8 | Ube Industries, Ltd. |
| Polytype | 21 R | 12.8 | Int. Syalons Newcastle Ltd. |

TABLE 3-continued

| Starting Material | Grade | Amount, Weight % | Manufacturer |
|---|---|---|---|
| Alumina | A 16SG | 14.5 | Alcoa |
| Yttria | Fine Grade | 4.9 | H. C. Starck |

The powders were mixed and milled together with suitable pressing aids in water. After milling the powder was dried and cold pressed to form insert blanks for the desired insert geometry.

The insert blanks were presintered to remove pressing aids and then sintered in a gas pressure sintering process at 1760° C. in $N_2$ at 12 bar for 2 h. After sintering the insert blanks were ground to insert style RNGN 120700E. The z-value was 1.4.

The material was then tested in a grooving and widening operation with coolant in Inconel 718 against a commercial SiAlON with z=1.9.

The following cutting conditions were used:
Cutting speed: 250 m/min
Feed: 0.15 mm/rev
Depth of Cut: 4 mm One cut is defined as a grooving operation followed by a widening by 30% in two steps.

Tool life until a Flank Wear (VB)>0.50 mm was reached was measured. The results are shown in Table 4.

TABLE 4

Number of Cuts Until VB > 0.50 mm

| Material | Number of Cuts |
|---|---|
| Invention (z = 1.4) | 10, 9, 12 |
| Commercial SiAlON | 9, 9, 12 |

As shown from Table 4 flank wear resistance is not only dependent on the z-value but also on processing conditions.

Toughness behavior

Further evaluation was carried out in the grooving-widening test in order to measure the toughness behavior of the materials. The test was run until fracture of the insert, which normally was recorded as one or more top slice fractures.

In addition to the material characterized by the starting materials from Table 3, an additional composition was made using AlN as a starting material instead of polytype 21 R. The amount and quantities of starting materials are found in Table 5. This material was consequently milled in propanoic alcohol; otherwise the processing route was identical.

TABLE 5

| Starting Material | Grade | Amount, Weight % | Manufacturer |
|---|---|---|---|
| Silicon Nitride | SN E-10 | 66.9 | Ube Industries, Ltd. |
| Aluminum Nitrate | Grade C | 10.0 | H. C. Starck |
| Alumina | A 16SG | 18.2 | Alcoa |
| Yttria | Fine Grade | 4.9 | H. C. Starck |

The z-value was 1.4.

Cutting tests were performed in the grooving-widening test with the following cutting data:

Cutting speed: 250 m/min
Feed: 0.15 and 0.25 mm/rev
Depth of cut: 0.15 mm/rev

TABLE 6

Tool Life to Fracture

| Test No. 1 | Number of Cuts to Fracture | Average | % Increase |
|---|---|---|---|
| Invention (z = 1.4) (AlN-based) | 7, 9, 10, 9, 7 | 8.4 | 8 |
| Commercial SiAlON (z = 1.8) | 9, 6, 8, 7, 9, | 7.8 | |

| Test No. 2 | Number of Cuts to Fracture | Average | % Increase |
|---|---|---|---|
| Invention (z = 1.4) (21R-based) | 15, 14, 15 | 14.7 | 19 |
| Commercial SiAlON (z = 1.8) | 12, 12, 13 | 12.3 | |

SiAlON materials with z=1.4 according to the present invention show a better edge toughness behavior than a commercial SiAlON material with a z value of z=1.8. This is probably due to a slightly higher fracture toughness.

The preceding examples have shown that the overall best performance of a beta SiAlON material with respect to wear resistance, thermal shock resistance and toughness behavior is obtained for a composition with z-values ranging from 1.0–1.5. If z is lower than 1.0 wear resistance and high cutting speed capability is significantly reduced and if z is larger than 1.5 thermal shock resistance is seriously affected. The material has a bimodal microstructure characterized in (see the FIGURE) elongated beta SiAlON grains with a length up to 25 μm and a diameter of up to 5 μm and smaller SiAlON grains with a diameter <2 μm, preferably <1 μm, with one or more intergranular phases situated in between the SiAlON grains.

The invention thus relates to a sintered ceramic material for high speed machining of heat resistant alloys. The ceramic material comprises SiAlON grains and 0.2–20 v/o, preferably, 5–15 v/o intergranular phase. At least 80 v/o, preferably at least 90 v/o, most preferably 100 v/o, of the SiAlON phase is beta SiAlON. The other SiAlON phases present may be alpha SiAlON, but due to deterioration of the thermal shock resistance, it should only be present in amounts up to 20 v/o of the total SiAlON, preferably, less than 10 v/o. In addition less then 10 v/o, preferably less than 5 v/o and most preferably less than 3 v/o of the total SiAlON may be polytype phases. This is a collective name of a number of phases in the SiAlON or in the Me-SiAlON systems which are closely related to the wurzit structure characteristic of AlN. The metal can be Y, Li, Ca, Mg, Be, Sc and metals from the La-series or mixtures thereof.

The intergranular phase is preferably a glass but other intergranular crystalline phases can be formed in which metals from the sintering aids are present such as YAG (Yttrium Aluminum Garnet), N—YAM or YAM (Yttrium Aluminum Melilite), b-phase (a distorted form of YAG) and phases having the same structure as apatite or wollastonite.

The material is further characterized in that the beta SiAlON ($Si_6 {-}_z Al_z O_z N8_{-z}$) has a z-value greater than 1.0, preferably greater than 1.2 but less than 1.5 and in a Vickers Hardness HV1 of more than 1530.

Preferred properties of material according to the invention are shown in table 7.

TABLE 7

| z | 1.4 |
|---|---|
| GPa Vickers Hardness (HV10) | 1480–1550 GPa |
| Vickers Hardness (HV1) | 1530–1600 |
| Identation Fracture Toughness ($K1_c$) | 4.6–5.0 MPam½ |
| Thermal Shock Resistance ($\Delta T_c$) | 550° C.–600° C. |
| Porosity | ≦A02 |
| Beta-SiAlON (peak ratio XRD) | 95%–100% |
| 12 H-polytype (peak ratio XRD) | <3% |
| YAG | <3 v/o |
| Intergranular Glass Phase | 8–12 v/o |

An addition of one or more refractory phases to SiAlON material according to the invention, in particular carbides or nitrides or solid solutions thereof of Ti, Zr and Hf, will increase the wear resistance of the material. This may have an adverse effect on toughness and thermal shock resistance due to the high thermal expansion of these compounds. If the above mentioned refractory phases are in form of whiskers with a small diameter, below 2 μm, preferably below 1 μm, toughness may be positively influenced.

The addition of refractory phases shall exceed 1 v/o but not exceed 35 v/o, preferably the amount is greater than 5 v/o but less than 25 v/o.

Further improvements of the wear resistance of the SiAlON material according to the invention may be obtained by coating with one or more refractory layers such as $Al_2O_3$, TiC, TiN or Ti(C,N) using methods known in the art such as CVD, MTCVD, PVD etc. The total thickness of the layers is less than 15 μm, preferably less than 10 μm.

Preliminary experiments with thin (1 μm) TiN-coatings on a substrate of the SiAlON material according to the present invention (z=1.4) showed in the grooving and widening test in Inconel 718 at a cutting speed of 250 m/min, feed 0,25 mm/rev and depth of cut 6 mm a 20% increase in the number of cuts to fracture and 10% increase in the flank wear resistance in comparison to the uncoated substrate.

SiAlON inserts according to the invention are made by powder metallurgical methods such as milling, pressing and sintering. Suitable proportions of powders of silicon nitride, alumina, yttria and aluminum nitride or polytype 21 R are milled and pressed to insert blanks as known in the art. The insert blanks are placed on sintering trays without embedding in a powder bed and sintered in a gas pressure sintering furnace. The final part of the sintering takes place at 1700° C.–1800° C. and with 10–15 bar nitrogen for 1–3 hours. After sintering, the insert blanks are ground to final shape and dimension. The advantage of using gas pressure sintering is that the nitrogen partial pressure is kept sufficiently high to prevent the silicon nitride from decomposing and avoiding volatile reactions between $Si_3N_4$ and metal oxide additions without having to encapsulate the insert blanks (HIP sintering process) or without having to embed the insert blanks with suitable powders (sintering under atmospheric pressure).

The invention also relates to a method for high speed machining of heat resistant alloys. A sintered ceramic cutting tool comprising SiAlON grains and an intergranular phase whereby of more than 70 v/o of the ceramic is SiAlON and at least 80 v/o of said SiAlON phase is beta SiAlON having a z-value greater than 1.0, but less than 1.5 is brought into contact with a heat resistant alloy workpiece. At least one of the cutting tool and workpiece moves relative to the other whereby material is removed by the cutting tool from the workpiece. The ceramic material has a Vickers Hardness HV1 of more than 1530.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A sintered ceramic material for high speed machining of heat resistant alloys said ceramic comprising SiAlON and 0.2–20 v/o intergranular phase whereby at least 80 v/o of said SiAlON phase is beta SiAlON ($Si_6-_zAl_zO_zN_{8-z}$) having a z-value greater than 1.0, but less than 1.5, said sintered ceramic material having a Vickers Hardness HV1 of more than 1530.

2. The sintered ceramic material of claim 1 wherein said material has a z-value greater than 1.2.

3. The sintered ceramic material of claim 1 wherein said material has a z-value of 1.4.

4. The sintered ceramic material of claim 1 wherein said SiAlON phase is at least 90% beta SiAlON.

5. The sintered ceramic material of claim 1 wherein the amount of intergranular glass phase is 8–12 v/o.

* * * * *